April 19, 1938.　　　H. R. LEWIS　　　2,114,537
PRODUCT TREATING MACHINE
Original Filed Aug. 15, 1933　　　3 Sheets-Sheet 1
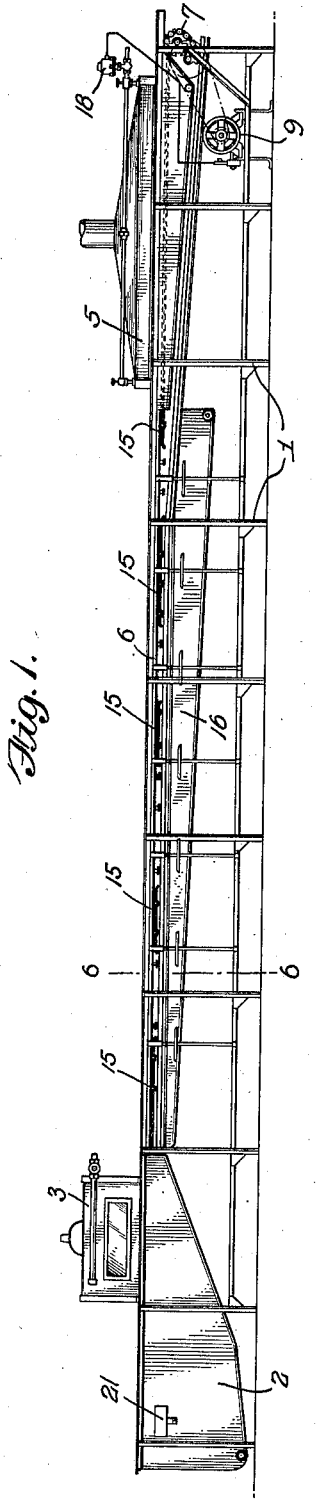
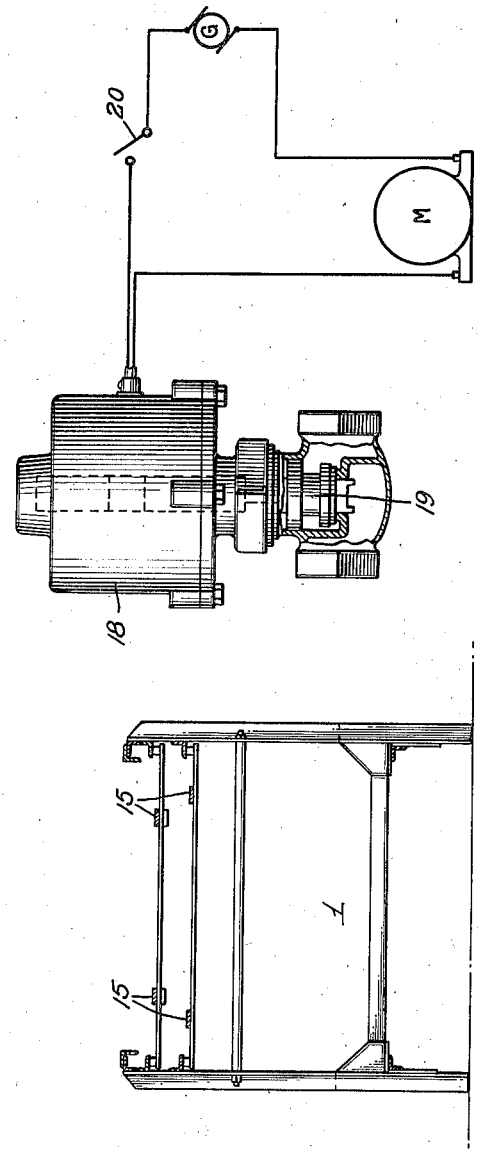
Inventor
Harold R. Lewis
By
Graham
Attorney

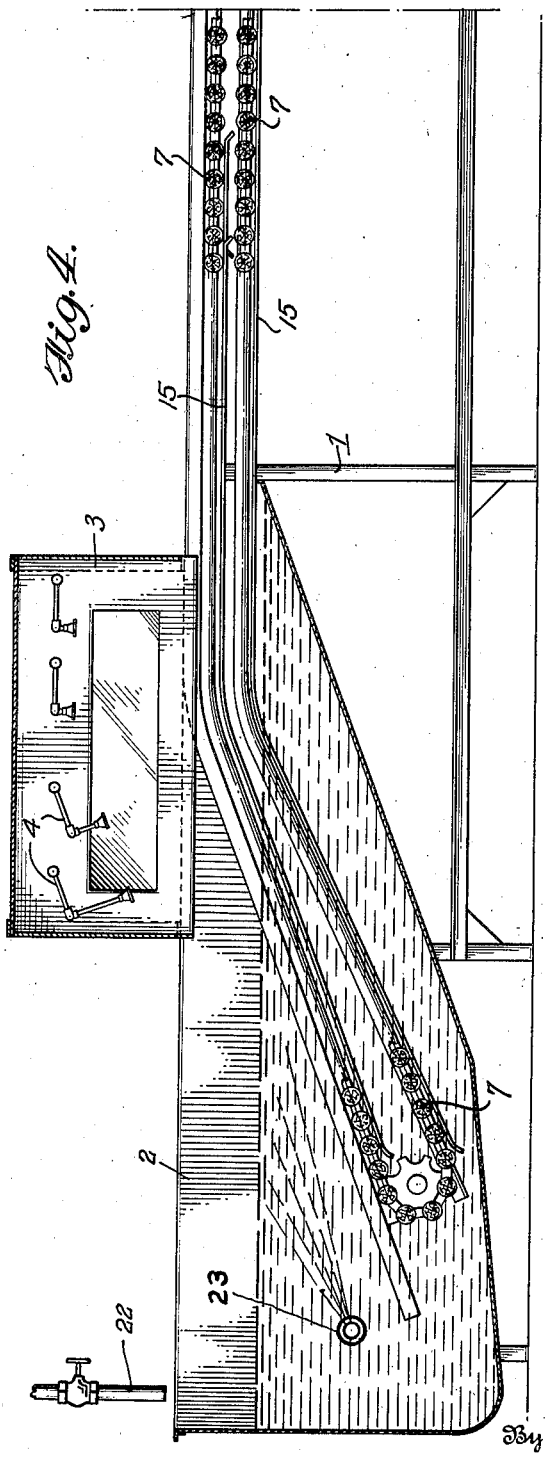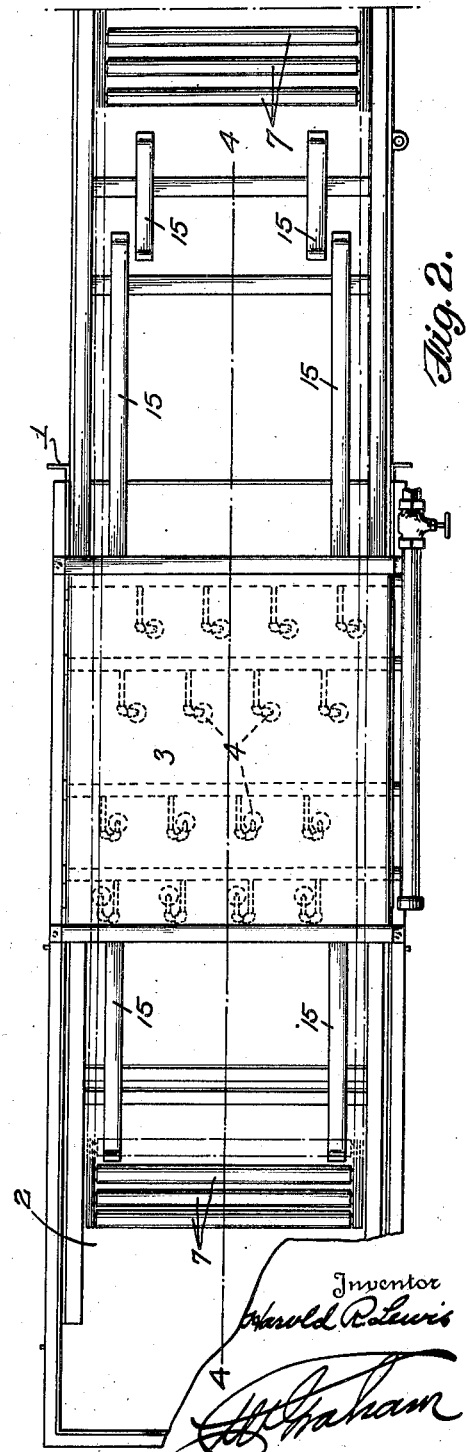

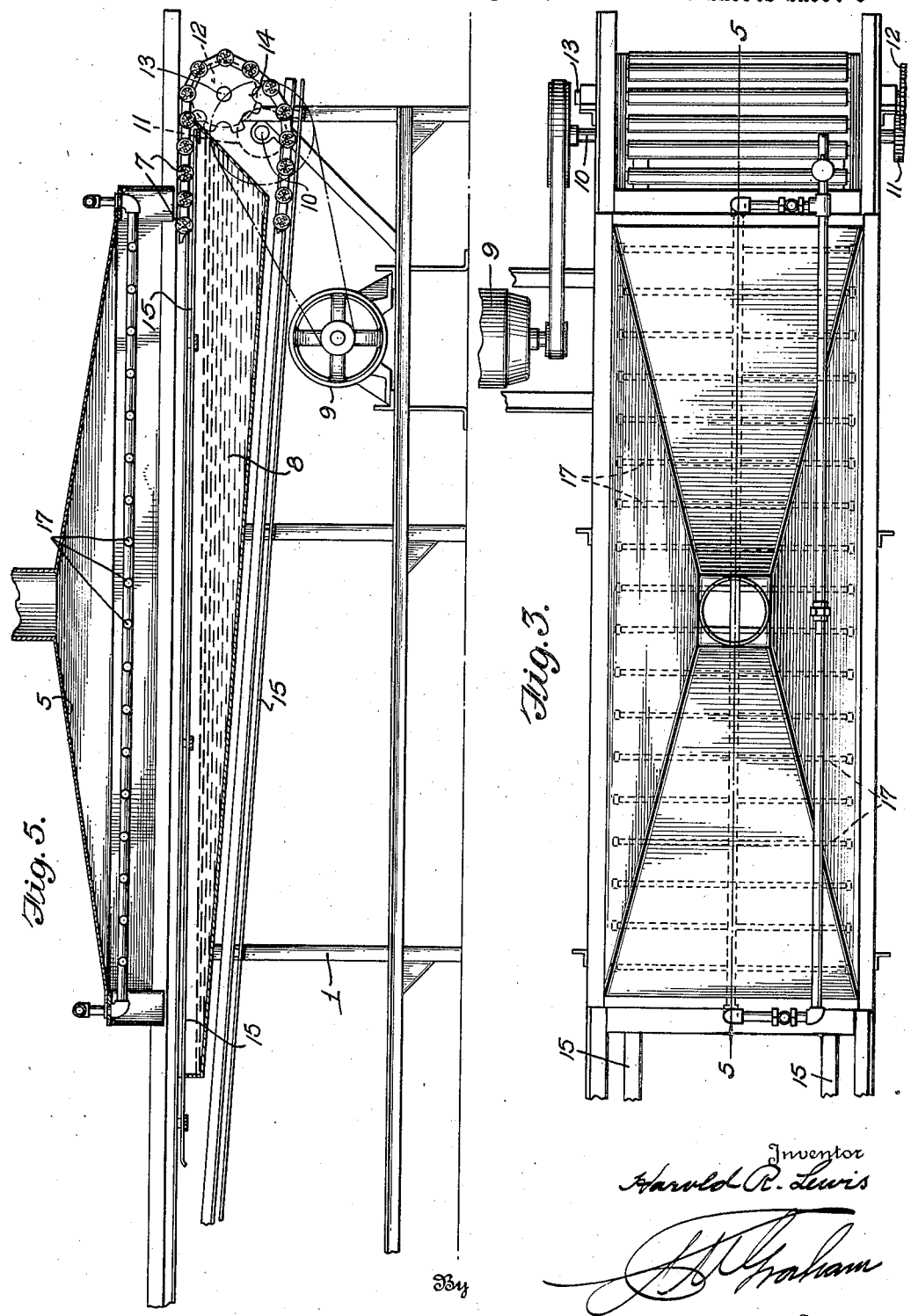

Patented Apr. 19, 1938

2,114,537

UNITED STATES PATENT OFFICE 2,114,537

PRODUCT TREATING MACHINE

Harold R. Lewis, Hoopeston, Ill., assignor to Food Machinery Corporation, San Jose, Calif., a corporation of Delaware Application August 15, 1933, Serial No. 685,279
Renewed December 9, 1936

2 Claims. (Cl. 146—194)

This invention relates to a machine for the preliminary treatment of fruits and vegetables prior to canning and is particularly adapted to the treatment of tomatoes.

Heretofore in machines for the pretreatment of ripe tomatoes more or less loss has occurred due to the transfer of the tomatoes from one conveying system to another or to conveyors of different types.

Each time a batch of ripe tomatoes are transferred from one type of mechanism for treatment by another type of mechanism the fruit is damaged some and the accumulation of such damage finally results in a much inferior product and a reduced price to the canner.

In the development of the machine forming the subject of this invention an effort has been made to so coordinate the several operations performed by the machine that the tomatoes will receive the minimum of abrasions and bruises so that they will emerge from the machine in substantially as good physical condition as when they entered.

As a general practice the operations of preparing a batch of tomatoes for canning includes washing, inspection and scalding. In carrying out these operations I have found that if the washing operation is performed as hereinafter set forth, the fruit will not only be cleaned of dirt and other foreign matter, but the washing operation will act to remove the decayed portions from the faulty fruit. The inspection operation is resorted to after washing for removal of fruit not fit for canning.

Tomatoes accumulate more or less debris and dirt during the growing period and if it is necessary to spray the vines more or less of spray material is deposited on the fruit. Spray materials used for this class of fruit is more or less soluble in water so that a thorough washing step will remove substantially all of it.

In accordance with my invention the washing step is employed not only for the purpose of washing away adhering dirt, but also for the purpose of removing from the fruit which is otherwise sound, decayed portions so that during the subsequent inspection step, inspection will be facilitated. In the inspection step fruit is caused to travel before the inspectors in such a manner that all surfaces of the fruit or tomatoes are thus in clean condition, permitting the inspectors to readily pick out the undesirable tomatoes easily and quickly so that the final pack will be up to the desired standard as to quality.

In preparing fully ripe tomatoes for canning I have found that even though the fruit or tomatoes be more or less of a delicate character, that they will stand the action of streams or sprays of water or washing liquid of considerable force without being unduly damaged thereby, and that the streams of water or washing liquid of considerable force will act to remove from the tomatoes the dirt, spray residue, and the portions of decayed fruit or tomatoes, leaving the fruit or tomatoes in a sound, clean condition for presentation to the inspectors in a subsequent step of the operations.

In the inspection of the fruit it is desirable that the fruit be turned so the inspectors can easily see all surfaces as the fruit is conveyed past their gaze. It is also desirable that for a portion of the time the fruit be moved along without being turned so that the surfaces exposed can be more easily seen and examined. If a series of successive periods of turning and rest repeated often enough to surely expose all surfaces of the fruit the inspection would be more effective and thorough.

Besides dirt and debris of various sorts accumulated by the fruit during the growing season the fruit sometimes acquires more or less of fungus growths, which if, left on or with the fruit during the preliminary treatments would tend to deteriorate the quality.

By giving the mass of moving fruit periodic stages of movement and rest the inspectors are enabled to more easily detect and remove from the mass any fruit affected by such growths.

The next step in the preliminary treatment of tomatoes is to scald the fruit to thereby loosen the skins somewhat and to give the fruit a slight preliminary cook and to steam sterilize the surfaces of the exposed fruit and incidentally scald and sterilize the conveyor which carries the fruit so that infection will not be transmitted to the oncoming fruit.

The machine of this application has been developed to perform all of the foregoing desirable steps in the preliminary treatment of fruits and vegetables, such as tomatoes through a mechanism that enables the operators to perform their duties in the most efficient manner.

Describing the machine and its operation, just generally, it comprises a frame work long enough to house and support all of the mechanism required to carry out the various preliminary treating steps. At the entrance end of the machine the tomatoes are dumped promiscuously into a tank of water which acts to soften their fall and prevent bruises as they touch each other and to give them a preliminary wetting to soak and soften the accumulations of dirt, debris and any spray residue or other undesirable material.

One continuous endless conveyor extends the entire length of the machine and conveys the fruit therethrough without change or transfer.

The entrance end of the conveyor extends down into the tank of water into which the tomatoes are dumped and due to the current set up in the body of water due to the conveyor movement the tomatoes will tend to flow or be carried by the movement of the water, toward the conveyor where they will be picked up and started on their trip through the machine.

Just as the tomatoes are raised up out of the water into which they were dumped, they pass under a water spray hood where sprays of wash water are projected onto them from a plurality of directions to wash off the soaked debris and thus expose the surfaces in a clean and bright condition for inspection. The water tank extends along under this spray station so that the dirt and debris washed from the fruit will be deposited in the tank from which it is removed at suitable intervals.

From this spray station, where water is usually used, but where any proper and desirable washing solution may be used, the tomatoes pass along over the inspection station where inspectors positioned at either side of the machine watch the mass of moving tomatoes carefully to detect and remove, by hand, any undesirable fruit.

It has been found that operators gazing steadily at a mass of moving objects sometime grow dizzy and get sleepy, and especially so if the objects are rolling over and over as well as moving along with the conveyor, and thus it is difficult, at times, to give proper inspection to the fruit.

In this machine the inspection station comprises a series of steps wherein, while the tomatoes are moved continuously along with the conveyor, they are only rolled over periodically so they present a series of periods where they do not rotate, then they are given a turn and remain at rest, as far as rotation is concerned, for a period which enables the inspectors to look at the resting tomatoes without the eye strain necessary when they are rotating all the time.

This change in the inspection operation has resulted in a much better inspection service than heretofore, and the inspectors are able to work for longer periods without eye strain or other inconvenience.

After the inspection the tomatoes pass under a comparatively long hood when they are steamed by the application of steam jets projected down onto the tomatoes while they are being turned by the roller conveyor.

The application of steam at this point sterilizes the surfaces of the tomatoes and gives them a slight preliminary cook and removes any adhering debris or other matter that was not removed by the washing step.

The steam also passes down into and around the rollers of the conveyor and thoroughly sterilizes all parts thereof so that no kind of infection or fungus growths or other matter will be carried by the conveyor and be deposited on new oncoming fruit. In this way the conveyor is always fresh and clean as it picks up the tomatoes from the dumping tank, other than a slight contamination that might be present through immersion in the tank water.

There are times during the operation of apparatus of this nature when stops have to be made for various reasons while a batch of fruit is on its way through the machine.

In order to prevent the burning or oversteaming of the tomatoes under the steam hood when such short stops occur, an automatic steam control has been provided that is electrically operated and will automatically shut off the steam when the current is cut off to stop the driving motor and automatically turn on the steam again when the motor is started.

It is therefore an object of the invention to provide an apparatus for the pretreatment of fruits and vegetables wherein a conveying system is employed that conveys the product through the apparatus without change wherein it is subjected to a plurality of operations.

It is also an object of the invention to provide an apparatus for the treatment of fruits and vegetables having a tank of water into which the product is dumped promiscuously to prevent bruising and abrasion and is picked out therefrom by the conveyor.

It is also an object of the invention to provide a washing station as a first step in the treatment, in which washing station there are employed sprays of washing liquid of considerable force which are directed against the fruit or tomatoes to remove adhering dirt and foreign matter and portions of decayed fruit to leave the fruit in a sound and clean condition for subsequent inspection.

It is a further object of the invention to provide an apparatus for the treatment of fruit and vegetables having an inspection station where the fruit is conveyed along continuously but is given rotation only periodically.

It is a further object of the invention to provide in an apparatus for treating fruit and the like, a steaming and sterilizing station where live hot steam is projected onto the passing product to sterilize the exposed surfaces and remove any adhering debris.

It is also an object of the invention to provide an apparatus for treating fruit or the like having a continuously moving conveyor for transporting the product through the various treatments and having means for rotating the fruit on its axes so that all surfaces will be subject to treatment.

It is a further object of the invention to provide an apparatus for the treatment of fruit or vegetables wherein live steam or other treating medium is projected on the passing product and the control of the admission of steam is automatic so that when for any reason the conveyor is stopped the steam is at the same time automatically shut off and when the conveyor is again started the steam is automatically again turned on.

With such objects in view as well as other advantages inherent in the invention, the novel structural peculiarities, novel organization of elements, and the separate and collective operations involved in carrying out the recited objects of the invention, which will be made the subject matter of claims hereto appended, I wish it understood that the several necessary elements and combinations constituting the same may be varied in their proportions, placement, general arrangement and operative relations without departing from the scope and nature of the invention.

In carrying out the objects of the invention in a concrete form or machine, further objects and advantages and improvement have been evolved than have been recited, and in order to make the invention more clearly understood, there are shown, in the accompanying drawings, means and mechanism embodying the preferred structural arrangement and the preferred disposition of the different parts and combinations, in which I have simply shown one way of embodying the creative part or concept of the invention. The described devices are simply embodiments of the invention which other structures might also employ and some of the parts and combinations may be used without the others in different types of machines without departure from the purview of the invention and I therefore regard myself as entitled to such variations from the shown and described devices as fall within the scope and meaning of the claims.

Referring now to the drawings accompanying this application, which are more or less diagrammatic in character and are not necessarily made to scale, a better and clearer understanding of the invention will be had.

Figure 1 is a side elevation of an apparatus embodying the invention.

Figure 2 is an enlarged plan of the feed end of the machine.

Figure 3 is an enlarged plan of the exit end of the machine.

Figure 4 is an enlarged sectional elevation of the feed end of the machine and has been taken on approximately the line 4—4 of Fig. 2.

Figure 5 is an enlarged sectional elevation of the exit end of the machine and has been taken on approximately the line 5—5 of Fig. 3.

Figure 6 is a cross section taken on line 6—6 of Fig. 1.

Figure 7 is a general view of the automatic steam cut off device and the circuit connected therewith.

The numeral 1 represents a long frame member on which the entire operative mechanism is mounted.

2 is the tank and the entrance end of the machine.

3 is the washing station just over the inner end of the tank.

4 are the spray devices in the washing section through which water or washing liquid of considerable force is directed against the tomatoes as they emerge from the liquid or wash water in the container 2 on the conveyor 7.

5 is the steaming section, and 6 is the inspection section and occupies substantially the entire space between the washing section and the steaming section.

7 is the endless conveyor which carries the product through the several treating stations without change.

8 is a drip pan under the steaming station to catch the condensation from the steam.

9 is a motor mounted under the exit end of the machine, driving the shaft 10 which extends across the machine and carries a pinion 11 meshing with the gear 12 on the shaft 13 which carries the sprockets 14 which in turn support and drive the roller conveyor 7. The rollers comprising the conveyor 7 are rotated on their axes by riding over stationary rails 15, the rails 15 being broken periodically through the inspection station as is clearly indicated in Fig. 1. A long drip pan is arranged under the conveyor through the inspection station as at 16.

Inside the hood 5 comprising the steaming station are a series of steam pipes 17 arranged to spray the entire top surface of the product passing therethrough. Steam is admitted to this spray system through the automatic control valve 18, which operates the actual steam valve 19 through magnetic means enclosed in the casing 18, the circuit being connected in series with the motor circuit so that when the motor is stopped during operation and while product is on the conveyor, the magnetic control will close the steam valve to prevent oversteaming the product. It is shown closed in Fig. 7 with the switch 20 open.

This control device is a standard product obtainable on the market so is not a part of applicant's invention per se, but is a part thereof in combination with his other operative elements.

*Operation*

The operation of this device with the operative elements arranged as in the accompanying drawings will be substantially as follows:

Tomatoes or other product are dumped promiscuously into the receiving tank 2 where they will probably all float and be gradually floated forward so the conveyor 7 can pick them up and carry them into the washing section 3. Here they encounter the sprays of water or washing liquid of considerable force issuing from the sprays 4 which will wash off the wet debris, decayed, or infirm portions of the fruit or tomatoes and dirt which will fall into and settle into the tank 2, from which it will be periodically removed. The liquid level is maintained in the tank 2 by means of an overflow, the water or other fluid being supplied in the quantity desired through the pipe 22. The previous soaking of the product in the tank 2 tends to loosen the debris and will actually dissolve some of it which will drop into the bottom of the tank or pass into solution with the washing liquid.

As soon as the product is washed and the debris removed by the spray devices the product, which is moving forward continually, passes out of the zone of the washing sprays and enters the zone of the inspection station. The movement of the conveyor with the rollers resting on the rails 15 causes the rolls to rotate and thereby rotate the product. As it enters the inspection zone the rails 15 are broken so that spaces of rest appear for the fruit where it is not rotated on its axes, which enable the inspectors to view it better and thus eliminate much of the undesirable product that might otherwise pass through. As the product is moving through the inspection zone with periodic rests from rotation and then receiving periodic rotation, the inspectors are not fatigued to the same extent as when the product is rotating continually, the periodic rotation, however, serving to present all sides and surfaces to the eyes of the inspectors with the result that the product coming from this machine is of a markedly improved quality, because with the rest periods undesirable product can be more readily detected than if it were rolling all the time.

As the product passes from the inspection zone it enters the zone of the steam treatment which acts to sterilize the surfaces of the product and to wash off and remove any adhering debris that has not been removed at the washing station, the steam also gives the product a slight preliminary cook and passing through and around the product impinges on the roller conveyor and tends to thoroughly sterilize it as it passes so that it is always clean as it enters the tank 2 for picking up and conveying the product therein. As the product passes out of the steam zone it is discharged from the machine and passes on to other operations in the process of canning.

At times it becomes necessary to stop the movement of the conveyor while it is completely covered with product. When this happens it is also necessary to shut off the steam entering the steaming station, otherwise the product under the steam jets would be damaged by oversteaming.

In the present instance an automatic steam valve has been incorporated in the steam line as designated at 18. This device comprises an electromagnet and a solenoid, the electromagnet being in series with the motor circuit so that when the motor is stopped by opening the switch 20 the current will be cut off the electromagnet and the solenoid and valve 19 will drop and shut off the steam. As soon as the switch 20 is again closed to start the motor the magnet will be energized, the solenoid will be lifted with the valve 19 and the steam will flow again.

It should be mentioned that while this device is convenient it is not necessary to the operation of the machine since any equivalent device or even an extra switch to control the current to the magnet would produce the desired result when properly manipulated.

Just a simple lever steam valve with a rod connection to the motor switch so that when the motor switch was opened the same movement would, through the rod connection move the lever steam valve and shut off the steam, and likewise when the motor switch was closed the same movement would open the steam valve.

On Figure 4 will be seen a pipe 23, located in the front end of the water tank where the product is placed and which has spray holes directed forward in the direction the product will travel due to the flow movement produced by the movement of the conveyor 7. The spray from this pipe will assist in moving the floating product forward in the liquid so that it will be picked up by the conveyor in sufficient quantity to give efficient operation.

What I claim as new and desire to secure by Letters Patent is:

1. An apparatus for preparing whole tomatoes or the like for canning comprising a series of treating stations, an endless conveyor consisting of a series of spaced rollers mounted for free rotation, endless elements supporting the ends of said rollers and holding them in transverse parallel relation, a soaking station including an open top tank for holding a supply of soaking liquid, a transverse shaft with sprockets located in said tank for supporting one end of said endless conveyor, guide members positioned in said tank to guide said conveyor from adjacent the bottom thereof up an inclined path over the open top of said tank, a spray pipe immersed in said tank and positioned forwardly of said conveyor to project liquid sprays toward the immersed portion of said conveyor to direct the tomatoes toward and onto the conveyor, a washing station positioned over the open top of said tank and including a series of spray devices to spray liquid on the stream of moving tomatoes as they are conveyed thereunder, an inspection section for visual inspection, said endless conveyor extending through said inspection section, spaced trackways positioned under the top run of said conveyor in said section to provide interrupted rotation of said supporting rollers, a final treating section positioned adjacent the exit end of said conveyor comprising a steam chamber enveloping the upper run of the endless conveyor, means within said chamber to treat the tomatoes on the upper run of the conveyor with live steam for sterilizing purposes, a drip pan under the upper and lower runs of said conveyor while passing over the inspection section and a drip pan between the upper and lower runs of the conveyor while passing through the steam sterilizing section and power means for moving said conveyor.

2. An apparatus for preparing whole tomatoes for canning, comprising a series of treating stations, an endless conveyor consisting of a series of spaced rollers mounted for free rotation, endless elements supporting the ends of said rollers and holding them in parallel transverse relation, an open top soaking tank for holding a supply of soaking liquid, means associated with said tank for supporting the receiving end of said endless conveyor in the tank, guide members positioned in said tank to guide said conveyor out of said tank up an inclined path over the top of said tank, a washing station adjacent said tank and including a series of spray devices to spray liquid on the stream of moving tomatoes as they are conveyed thereunder, said sprays having sufficient force to wash away the infirm portions without injury to the firm portions, means for rotating said rolls as they are moved through said washing station, an inspection station for visual inspection of said tomatoes, means for rotating said rollers as they pass said inspection station, a final treating station positioned adjacent the exit end of said conveyor comprising a steam chamber enveloping the upper run of said conveyor, means within said chamber to treat the tomatoes on the upper run of said conveyor with live steam, for sterilizing purposes and to loosen the skin thereof, means for rotating the rollers as they travel through said steaming station, and power means for driving said conveyor.

HAROLD R. LEWIS.